US008358047B2

(12) United States Patent
Gulvin et al.

(10) Patent No.: US 8,358,047 B2
(45) Date of Patent: Jan. 22, 2013

(54) BURIED TRACES FOR SEALED ELECTROSTATIC MEMBRANE ACTUATORS OR SENSORS

(75) Inventors: Peter M. Gulvin, Webster, NY (US); Peter J. Nystrom, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1016 days.

(21) Appl. No.: 12/240,251

(22) Filed: Sep. 29, 2008

(65) Prior Publication Data

US 2010/0077609 A1 Apr. 1, 2010

(51) Int. Cl.
*H02N 1/00* (2006.01)
*H01G 7/00* (2006.01)
*G01L 9/12* (2006.01)

(52) U.S. Cl. .................. 310/309; 361/283.1; 361/283.4; 73/718; 438/51

(58) Field of Classification Search .................. 310/309; 361/283.1, 283.4; 73/718; 438/51; 257/415
See application file for complete search history.

(56) References Cited

U.S. PATENT DOCUMENTS 4,441,791 A * 4/1984 Hornbeck .................... 359/295
4,609,966 A * 9/1986 Kuisma .................... 361/283.1
4,773,972 A * 9/1988 Mikkor .................... 156/89.15
5,049,978 A * 9/1991 Bates et al. .................... 257/686
6,430,109 B1 * 8/2002 Khuri-Yakub et al. ........ 367/181
6,608,268 B1 * 8/2003 Goldsmith .................... 200/181
6,874,367 B2 * 4/2005 Jakobsen .................... 73/718
6,892,582 B1 * 5/2005 Satou et al. .................... 73/715
2004/0253123 A1 * 12/2004 Xie et al. .................... 417/410.1
2006/0046350 A1 * 3/2006 Jiang et al. .................... 438/114
2006/0108675 A1 * 5/2006 Colgan et al. .................... 257/684
2008/0239494 A1 * 10/2008 Zander .................... 359/578
2008/0296495 A1 * 12/2008 Whitehouse et al. .......... 250/292
2009/0001853 A1 * 1/2009 Adachi et al. ............ 310/323.19
2010/0077609 A1 * 4/2010 Gulvin et al. .................... 29/846

* cited by examiner

*Primary Examiner* — Quyen Leung
*Assistant Examiner* — Terrance Kenerly
(74) *Attorney, Agent, or Firm* — MH2 Technology Law Group LLP

(57) ABSTRACT

In accordance with the invention, there are micro-electromechanical devices and methods of fabricating them. An exemplary micro-electromechanical device can include a first dielectric layer; a buried conductive trace disposed over the first dielectric layer, such that the buried conductor trace is electrically connected to an outside power source; a second dielectric layer disposed over the buried conductive trace; at least one conductive electrode disposed over the second dielectric layer and electrically connected to the buried conductive trace; and at least one conductive membrane including membrane anchors disposed over the second dielectric layer, such that the at least one conductive membrane is electrically isolated from the at least one conductive electrode and the buried conductor trace, wherein the at least one conductive electrode is electrically connected to the power source through the buried conductive trace.

13 Claims, 8 Drawing Sheets

BURIED TRACES FOR SEALED ELECTROSTATIC MEMBRANE ACTUATORS OR SENSORS

FIELD OF THE INVENTION

The present invention relates to electrostatically actuated devices and more particularly to micro-electromechanical devices and methods of making them.

BACKGROUND OF THE INVENTION

Conventional ink-jet printing can employ thermal ink jet printheads, piezoelectric printheads, or electrostatic printheads. In an electrostatic printhead, droplets of ink are selectively ejected from a plurality of drop ejectors in the printhead. Each of the plurality of drop ejectors includes a flexible sealed chamber with air on the inside and ink on the outside. The chamber containing the ink, located above the flexible chamber, has an inlet connected to an ink reservoir and a nozzle to eject the ink. Upon application of a voltage to an electrode inside the air chamber, the grounded membrane ceiling is deflected downward, thereby increasing the volume of the ink chamber and lowering its pressure. This causes ink to flow into the ink chamber from the ink reservoir. Then the electrode is grounded and the membrane pops up, creating a pressure spike in the ink cavity that ejects a drop from the nozzle. When making these sealed chambers, there needs to be a way to get an electrical trace from the electrode inside the chamber to a bond pad on the outside without damaging the integrity of the seal and without shorting the signal to ground. Furthermore, whatever strategy is used must withstand a long hydrofluoric acid (HF) etch which is used to etch away the silicon dioxide from inside the devices. The actual etching of the oxide inside the eventual air cavity is done through a series of holes in the ceiling that are later plugged by oxide and metal, but there is no way for the trace to exit vertically through these same holes.

Conventionally, the trace is passed through a long tube, which is long enough so that it is never completely released, and the remaining oxide acts as a plug to maintain the integrity of the seal. However, the partially-released tube is a liability because later wet processing can cause contamination to get inside. Removal of the contamination is very difficult because of the length of the tube, its small cross-section, and the sealed end. This contamination can cause shorting between the trace and the grounded plate above. Additionally, the long tube takes up significant chip area, adding more than 10% to the die area despite being folded up for compactness. Since the 10% is all in the process direction, the "waterfront" of the chip is also 10% bigger. Waterfront is the amount of space occupied by the printhead face or die length in the process direction. In a drum architecture, this is in the direction of the circumference of the drum. Having a large waterfront adversely affects image quality due to the larger spread of distances between the planar printhead and the cylindrical intermediate drum. Large waterfront also consumes large space within the printer, necessitating larger drum diameter or splitting the head into smaller "facets".

Accordingly, there is a need for new ways to get an electrical trace from the electrode inside the chamber to a bond pad on the outside.

SUMMARY OF THE INVENTION

In accordance with various embodiments, there is a method of fabricating a micro-electromechanical device. The method can include providing a first dielectric layer, depositing a buried conductor layer over the first dielectric layer, and patterning the buried conductor layer to form a buried conductive trace, such that the buried conductive trace is electrically connected to an outside power source. The method can also include depositing a second dielectric layer over the buried conductor layer, patterning the second dielectric layer to create one or more vias that extend up to the buried conductive trace, depositing a first conductor layer over the second dielectric layer and patterning the first conductor layer to form at least one conductive electrode electrically connected to the buried conductive trace through the one or more vias. The method can further include forming at least one conductive membrane comprising membrane anchors, the membrane anchors disposed over the second dielectric layer, such that the at least one conductive membrane is electrically isolated from the at least one conductive electrode and the buried conductive trace, wherein the at least one conductive electrode is electrically connected to the power source through the buried conductive trace.

According to various embodiments, there is a micro-electromechanical device including a first dielectric layer and a buried conductive trace disposed over the first dielectric layer, such that the buried conductor trace is electrically connected to an outside power source. The micro-electromechanical device can also include a second dielectric layer disposed over the buried conductive trace, the second dielectric layer including one or more vias that extend up to the buried conductive trace, and at least one conductive electrode disposed over the second dielectric layer and electrically connected to the buried conductive trace through the one or more vias. The micro-electromechanical device can further include at least one conductive membrane including membrane anchors disposed over the second dielectric layer, such that the at least one conductive membrane is electrically isolated from the at least one conductive electrode and the buried conductor trace, wherein the at least one conductive electrode is electrically connected to the power source through the buried conductive trace.

According to yet another embodiment, there is a method of fabricating a micro-electromechanical device. The method can include forming a first dopant-well in a second dopant-doped substrate, depositing a first dielectric layer over the substrate, depositing a second dielectric layer over the first dielectric layer, and forming at least one via through the first and the second dielectric layer to form an electrical contact between the first dopant-well and a trace, wherein the trace is electrically connected to an outside power source. The method can also include depositing a first conductor layer over the second dielectric layer and patterning the first conductor layer to form at least one conductive electrode electrically connected to the first dopant-well. The method can further include forming at least one conductive membrane including membrane anchors, the membrane anchors disposed over the second dielectric layer, such that the at least one conductive membrane is electrically isolated from the conductive electrodes and the substrate, wherein the at least one conductive electrode is electrically connected to the power source through the first dopant-well.

According to another embodiment, there is a micro-electromechanical device. The micro-electromechanical device can include a first dielectric layer disposed over a second dopant-doped substrate, the second dopant-doped substrate including a first dopant-well and a second dielectric layer disposed over the first dielectric layer. The micro-electromechanical device can also include at least one via through the first and the second dielectric layer to form an electrical contact between the first dopant-well and a trace, wherein the trace is electrically connected to an outside power source. The micro-electromechanical device can further include at least one conductive electrode electrically connected to the first dopant-well and at least one conductive membrane including membrane anchors, the membrane anchors disposed over the second dielectric layer, such that the at least one conductive membrane is electrically isolated from the conductive electrodes and the substrate, wherein the at least one conductive electrode is electrically connected to the power source through the first dopant-well.

Additional advantages of the embodiments will be set forth in part in the description which follows, and in part will be obvious from the description, or may be learned by practice of the invention. The advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g. 1 to 5. In certain cases, the numerical values as stated for the parameter can take on negative values. In this case, the example value of range stated as "less that 10" ban assume negative values, e.g. −1, −2, −3, −10, −20, −30$^-$, etc.

Figure 1A:
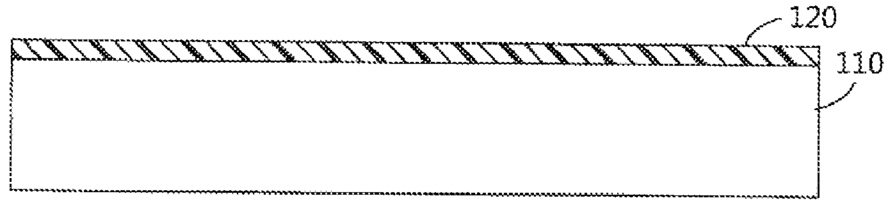
FIGS. 1-8 illustrate an exemplary method of fabricating a micro-electromechanical device, according to various embodiments of the present teachings.
Figure 1B:
Figure 2:
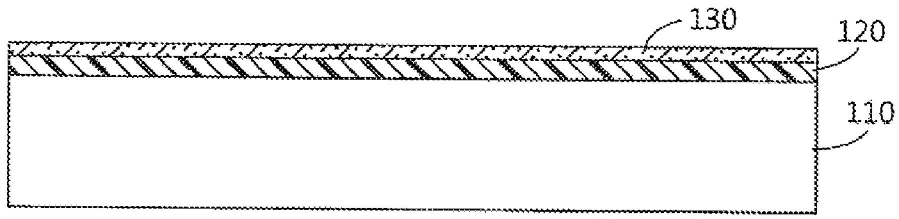
Figure 3:
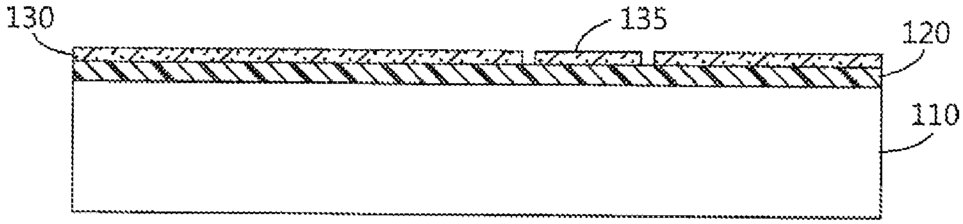
Figure 4:
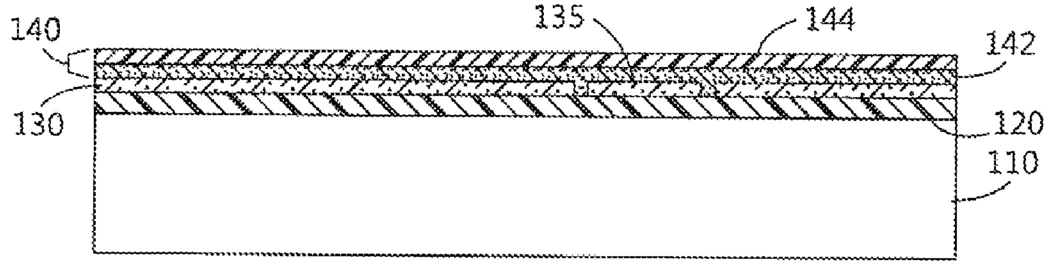
Figure 5:
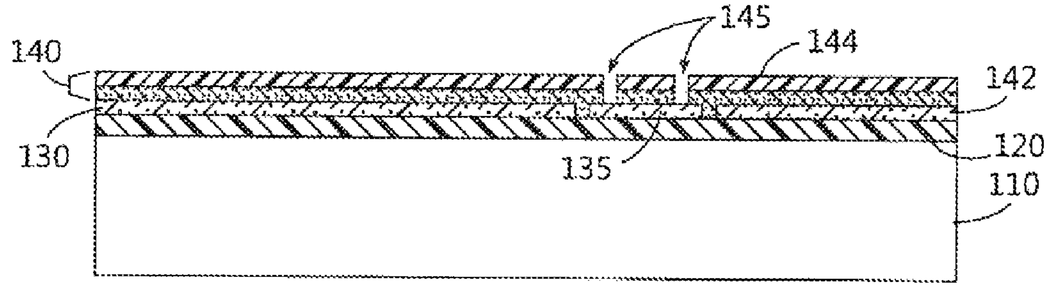
Figure 6:
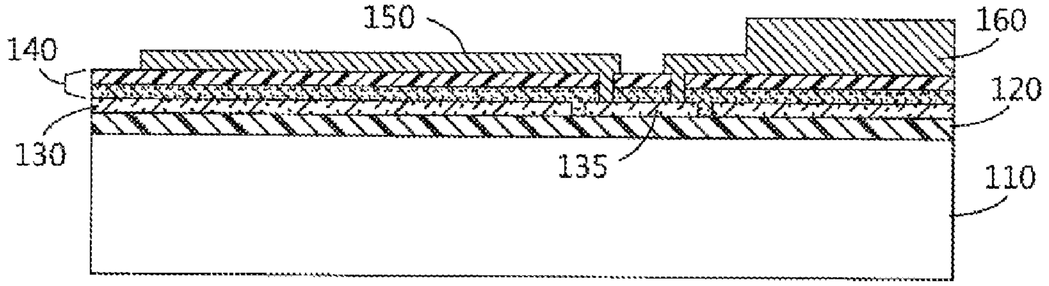

FIGS. 1-8 illustrate an exemplary method of fabricating a micro-electromechanical device 100. The method can include providing a first dielectric layer 120, as shown in FIGS. 1A and 1B. In some embodiments, the step of providing a first dielectric layer 120 can include providing a first dielectric layer 120 disposed over an electrically conductive substrate 110, as shown in FIG. 1A. In various embodiments, the electrically conductive substrate 110 can include any suitable material, such as, for example, doped silicon and metal. In other embodiments, the step of providing a first dielectric layer 120 can include providing an insulator substrate. In various embodiments, insulator substrate can include any suitable material, such as, for example, undoped silicon, glass, quartz, and metal with a thin insulating film. In some embodiments, the first dielectric layer 120 can be a field oxide layer having a thickness, for example, from about 0.2 μm to about 5 μm and in other cases, the field oxide layer can have a thickness from about 1.0 μm to about 2.0 μm. The method can also include depositing a buried conductor layer 130 over the first dielectric layer 120 as shown in FIG. 2 and patterning and etching the buried conductor layer 130 to form a buried conductive trace 135 that is electrically connected to an outside power source, as shown in FIGS. 3 and 6. In various embodiments, the buried conductive trace 135 can be electrically connected to a power source with a conductive trace 160 and/or a metal trace 180, as shown in FIG. 8. In certain embodiments, the step of depositing a buried conductor layer 130 over the first dielectric layer 120 can include depositing a polysilicon layer 130 over the first dielectric layer 120. In some embodiments, the method can also include doping the buried conductive trace 135. In some cases, the buried conductive trace 135 can have a thickness from about 0.05 μm to about 1 μm and in other cases, the buried conductive trace 135 can have a thickness from about 0.1 μm to about 0.5 μm. The method can further include depositing a second dielectric layer 140 over the buried conductor layer 130, as shown in FIG. 4. In various embodiments, the step of depositing a second dielectric layer 140 over the buried conductor layer 130 can include depositing a silicon oxide layer 142 over the buried conductor layer 130 and depositing a silicon nitride layer 144 over the silicon oxide layer 142, as shown in FIG. 4. In some cases, the silicon oxide layer 142 can have a thickness from about 0.05 μm to about 1 μm and in other cases, the silicon oxide layer 142 can have a thickness from about 0.2 μm to about 0.6 μm. In some cases, the silicon nitride layer 144 can have a thickness from about 0.05 μm to about 0.8 μm and in other cases, the silicon nitride layer 144 can have a thickness from about 0.1 μm to about 0.4 μm. The method can also include patterning the second dielectric layer 140 to create one or more vias 145 that extend up to the buried conductive trace 135, as shown in FIG. 5

Figure 7:
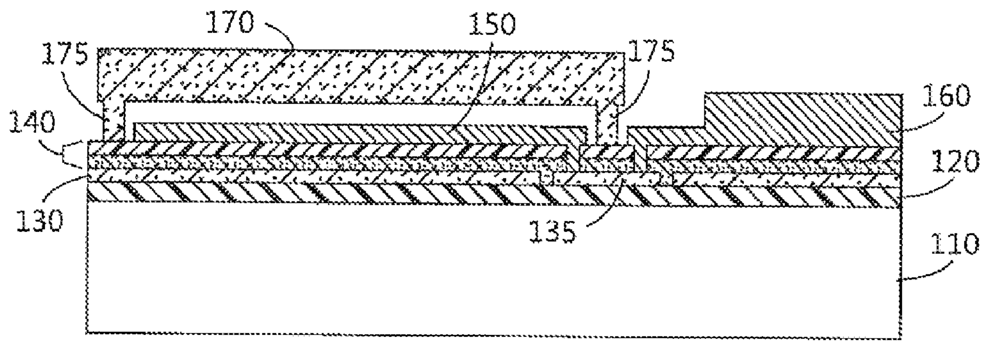

The method of fabricating a micro-electromechanical device 100 can further include depositing a first conductor layer over the second dielectric layer 140 and patterning the first conductor layer to form at least one conductive electrode 150 electrically connected to the buried conductive trace 135 through the one or more vias 145, as shown in FIG. 6. The method can further include forming at least one conductive membrane 170 including membrane anchors 175 over the second dielectric layer 140, such that the at least one conductive membrane 170 is electrically isolated from the at least one conductive electrode 150 and the buried conductive trace 135, wherein the at least one conductive electrode 150 is electrically connected to the power source through the buried conductive trace 135, as shown in FIG. 7. The step of forming at least one conductive membrane 170 including membrane anchors 175 disposed over the second dielectric layer 140 can include depositing a sacrificial layer (not shown) over the first conductor layer 150, patterning a plurality of holes (not shown) in the sacrificial layer, depositing a second conductor layer 170 over the sacrificial layer, and filling the plurality of holes, thereby forming a plurality of membrane anchors. The step of forming at least one conductive membrane 170 including membrane anchors 175 can further include patterning a plurality of holes (not shown) in the second conductor layer 170, removing the sacrificial layer by etching through the plurality of holes, and plugging the plurality of holes to form a seal that keeps air inside and ink outside thereby forming at least one conductive membrane 170 including membrane anchors. Any suitable etchant such as, for example, hydrofluoric acid, can be used to remove the sacrificial layer using the plurality of holes as inlets for the etchant and outlet for the etch byproducts.

In various embodiments, the method of fabricating a micro-electromechanical device 100 can include patterning the first conductor layer and the second dielectric layer 140 to form at least one conductive electrode 150 electrically connected to the buried conductive trace 135 and one or more first conductive layer regions (not shown) electrically isolated from the conductive electrode 150 and forming at least one conductive membrane 170 including membrane anchors 175, wherein the membrane anchors 175 can be disposed over the one or more first conductive layer regions (not shown) electrically isolated from the conductive electrode 150. In various embodiments, the method can also include depositing a metal layer 180 over the trace 160, as shown in FIG. 8.

In this manner, as disclosed herein, a micro-electromechanical device can be formed which can have about 10% reduction in the chip size and waterfront resulting in about 10% reduction in the chip cost. Furthermore, absence of the contamination-laden dead end tube can reduce the risk of shorting in this region along with about 100 times reduction in the resistance of the device, which can result in a decrease in power consumption and RC time constant. Additionally, there is more flexibility in other aspects of the design and architecture of the device, such as simplified routing of traces by allowing crossing of buried and standard traces; routing of traces out the other side of the chip, which can be useful for multiple rows on one chip; routing of traces under devices; and feasibility of running an air venting structure that can tie all the devices together on the same side as the traces/wires.

Figure 8A:
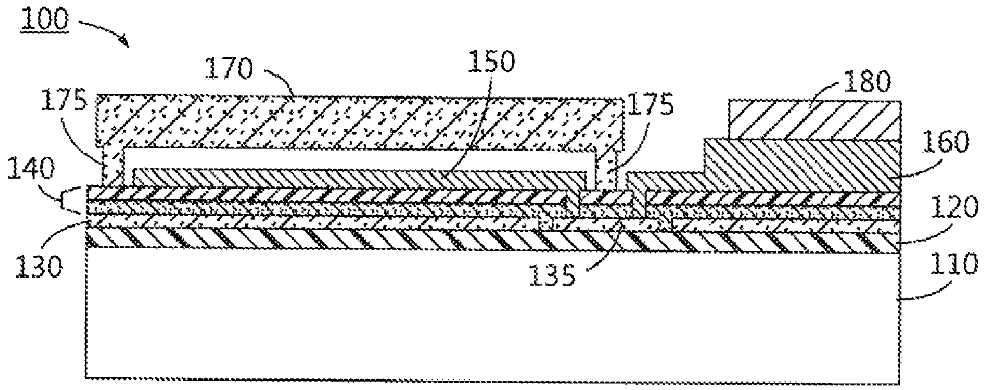
Figure 8B:
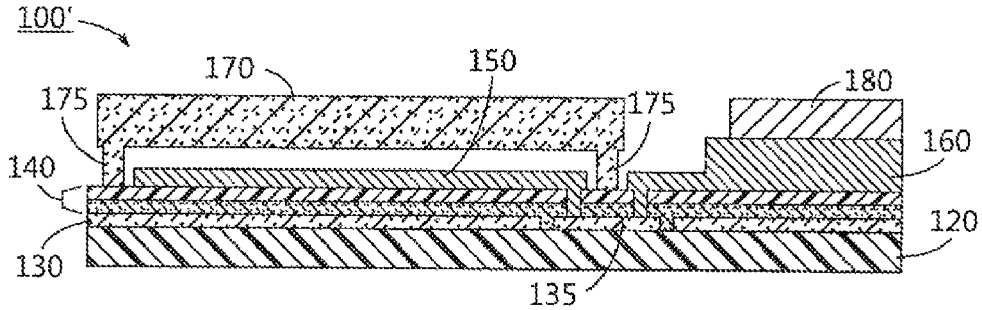
Figure 8C:
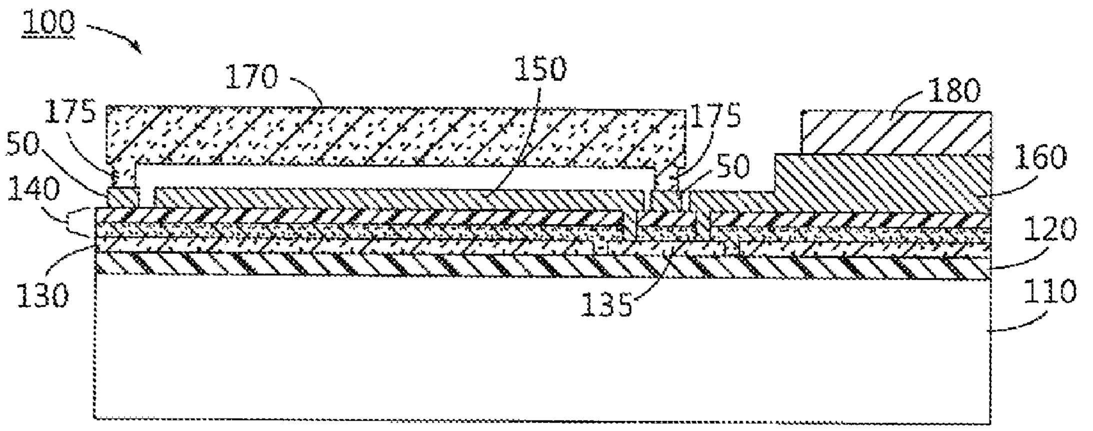
Figure 9:
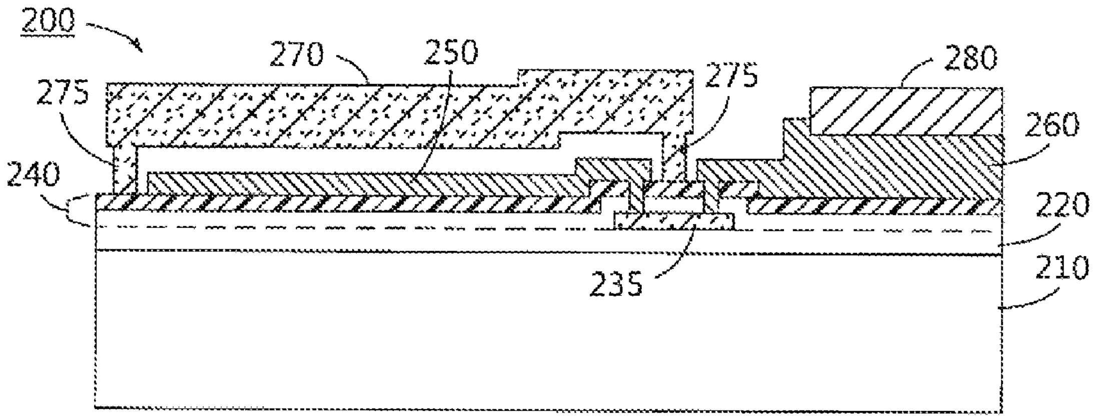
FIG. 9 illustrates another exemplary micro-electromechanical device, according to various embodiments of the present teachings.
Figure 10:
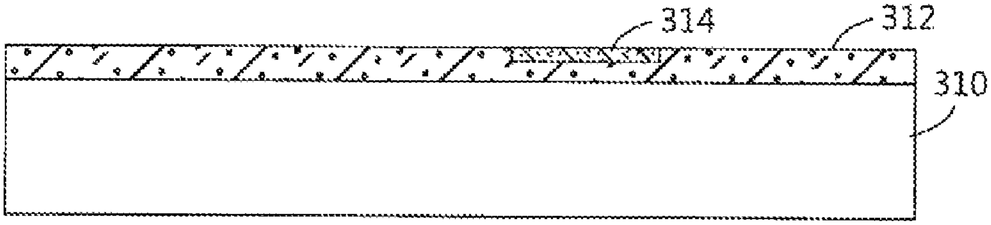
FIGS. 10-16 illustrate another exemplary method of fabricating a micro-electromechanical device, according to various embodiments of the present teachings.
Figure 11:
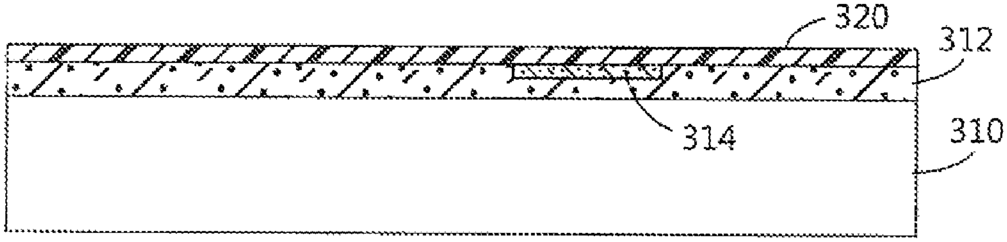

FIGS. 8A, 8B, 8C and 9 depict exemplary micro-electromechanical devices 100, 100', 200. The micro-electromechanical device 100, 100', 200 can include a first dielectric layer 120, 220. In some embodiments, the first dielectric layer 120 can be disposed over an electrically conductive substrate 110, 210, as shown in FIG. 8A. Any suitable material can be used for the conductive substrate 110 such as, for example, doped silicon and metal. In some embodiments, the first dielectric layer 120 can be an insulator substrate, as shown in FIG. 8B. Any suitable material can be used for the insulator substrate such as, for example, undoped silicon, glass, quartz, and metal with a thin insulating film. The micro-electromechanical device 100, 100', 200 can include a buried conductive trace 135, 235 disposed over the first dielectric layer 120, 220, such that the buried conductive trace 135, 235 is electrically connected to a power source (not shown). In some embodiments, the buried conductive trace 135 can extend with gaps in between to preserve a planar topography, as shown in FIG. 8. In other embodiments, the buried polysilicon layer 235 can be present only where required, as shown in FIG. 9. In certain embodiments, the first dielectric layer 120, 220 can include a field oxide layer. In various embodiments, the buried conductive trace 135, 235 can be a p-doped buried polysilicon trace or an n-type buried polysilicon trace. The micro-electromechanical device 100, 100', 200 can also include a second dielectric layer 140, 240 disposed over the buried conductive trace 135, 235, the second dielectric layer 140, 240 including one or more vias that extend up to the buried conductive trace 135 and at least one conductive electrode 150, 250 disposed over the second dielectric layer 140, 240 and electrically connected to the buried conductive trace 135, 235 through the one or more vias. In various embodiments, the second dielectric layer 140, 240 can include a silicon oxide layer 142 disposed over the buried conductive trace 135, 235 and a silicon nitride layer 144 disposed over the silicon oxide layer. The micro-electromechanical device 100, 100', 200 can further include at least one conductive membrane 170, 270 including membrane anchors 175, 275, the membrane anchors 175, 275 disposed over the second dielectric layer 140, 240, such that the at least one conductive membrane 170, 270 is electrically isolated from the at least one conductive electrode 150, 250 and the buried conductive trace 135, 235, wherein the at least one conductive electrode 150, 250 is electrically connected to the power source through the buried conductive trace 135, 235. In various embodiments, the membrane anchors 175, 275 can be disposed over one or more first conductive layer regions ((50) electrically isolated from the conductive electrode 150, 250. The micro-electromechanical device 100, 100', 200 can also include a metal layer 180, 280 over the trace 160, 260. One of ordinary skill in the art would know that though the at least one conductive electrode 150, 250 is electrically connected to the power source through the buried conductive trace 135, 235; it is not a direct connection.

In various embodiments, the buried conductive trace 135, 230 can be as wide as the conductive electrode 150, 250, which can be about 100 μm wide. Current traces are generally about 10 μm wide, 0.3 μm thick, and about 750 μm long. Whereas traces in the disclosed micro-electromechanical devices 100, 100', 200 can be about 100 μm wide, 0.3 μm thick, and up to about 30 μm long, which can lead to a reduction of up to about 250 times in the resistance, which can lead to decrease in the power consumption and RC time constant.

According to various embodiments, there is a method of fabricating a micro-electromechanical device 300, as shown in FIGS. 10-16. The method can include forming a first dopant-well 314 in a second dopant-doped substrate 310. In various embodiments, the substrate 310 can include any suitable material, such as, for example, silicon, germanium, gallium arsenide, and gallium phosphide. In some embodiments, the substrate 310 can be doped partially with a second dopant, as shown in FIG. 1, wherein the substrate 310 includes a second dopant-doped layer 312. In other embodiments, the first dopant can be selected from the group consisting of nitrogen, phosphorus, arsenic, antimony, and bismuth and the second dopant can be selected from the group consisting of boron, aluminum, gallium, indium, and thalium. In some other embodiments, the first dopant can be selected from the group consisting of boron, aluminum, gallium, indium, and thalium and the second dopant can be selected from the group consisting of nitrogen, phosphorus, arsenic, antimony, and bismuth. In certain embodiments, if the substrate 310 can be doped with a p-type dopants, such as, for example, boron, aluminum, gallium, indium, and thalium, and the voltage applied to the conductive electrode 350 can be positive, then a first dopant-well 314 would not be required. In various embodiments, the step of forming a first dopant-well 314 in a second dopant-doped substrate can include depositing a masking layer (not shown) over a second dopant-doped substrate 310, patterning the masking layer, and forming the first dopant-well 314 by at least one of thermal diffusion and ion implantation. The doping level of the first dopant-well 314 can be determined from the FIG. 17, which displays an exemplary avalanche breakdown voltage as a function of doping concentration at 300K for various substrates. Hence, for silicon substrate, an operating voltage of up to about 240 V, a doping concentration of $10^{15}$ $cm^{-3}$, the avalanche breakdown voltage is about 400V, which would provide a good factor of safety.

Figure 12:
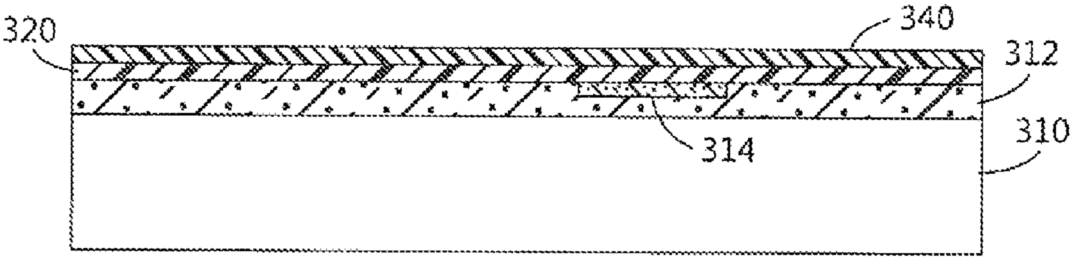
Figure 13:
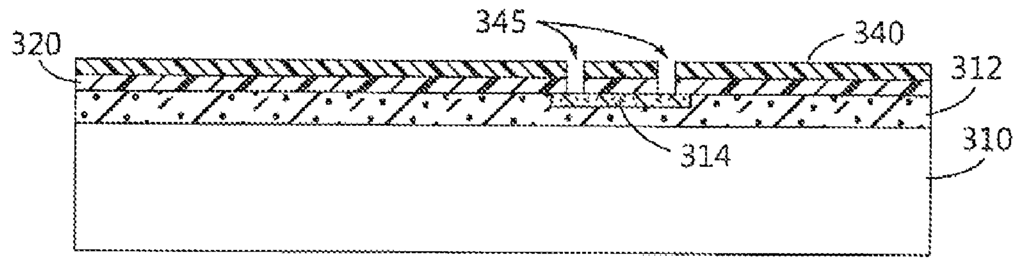
Figure 14:
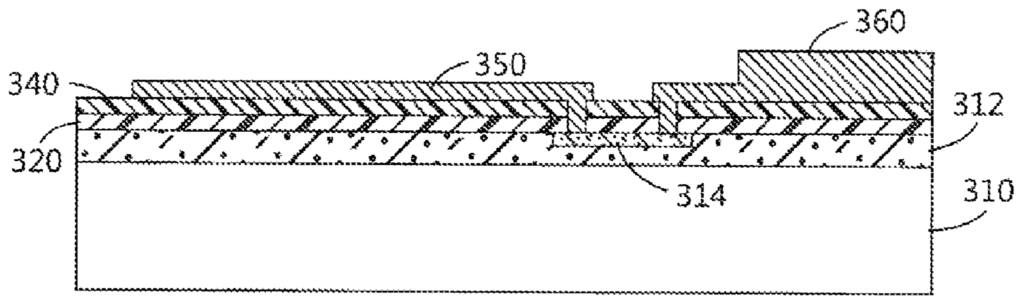
Figure 15:
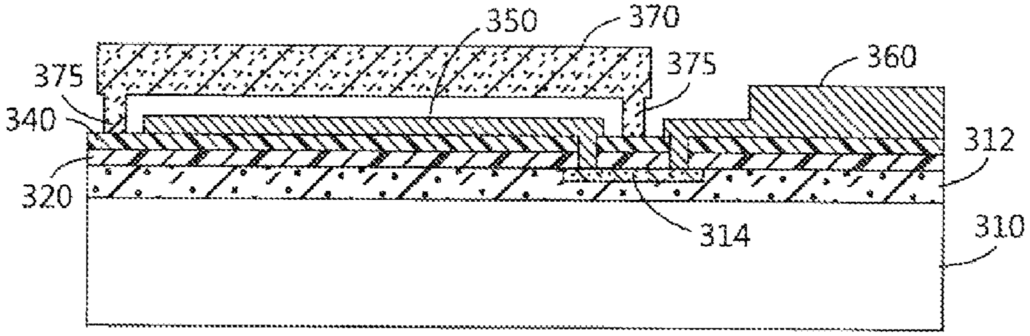

The method of fabricating a micro-electromechanical device 300 can also include depositing a first dielectric layer 320 over the substrate 310 and depositing a second dielectric layer 340 over the first dielectric layer 320, as shown in FIG. 12. In some embodiments, the step of depositing the first dielectric layer 320 over the substrate 310 can include depositing a field oxide layer over the substrate 310. In other embodiments, the step of depositing the second dielectric layer 340 over the first dielectric layer 320 can include depositing a silicon nitride layer over the first dielectric layer 320. However, any suitable material can be used for the first dielectric layer 320 and the second dielectric layer 340. The method can further include forming at least one via 345 through the first dielectric layer 320 and the second dielectric layer 340 to form an electrical contact between the first dopant-well 314 and a trace 360, as shown in FIG. 13, wherein the trace 360 can be electrically connected to an power source (not shown). The method can further include depositing a first conductor layer over the second dielectric layer 340 and patterning the first conductor layer to form at least one conductive electrode 350 electrically connected to the first dopant-well 314, as shown in FIG. 14 and forming at least one conductive membrane 370 including membrane anchors 375 disposed over the second dielectric layer 340, such that the at least one conductive membrane 370 is electrically isolated from the conductive electrodes 350 and the substrate 310, wherein the at least one conductive electrode 350 is electrically connected to the power source through the first dopant-well 314. In various embodiments, the step of forming at least one conductive membrane 370 including membrane anchors 375 disposed over the second dielectric layer 340 can include depositing a sacrificial layer (not shown) over the first conductor layer 350, patterning a plurality of holes in the sacrificial layer, depositing a second conductor layer 370 over the sacrificial layer and filling the plurality of holes, thereby forming a plurality of membrane anchors 375. The step of forming at least one conductive membrane 370 including membrane anchors 375 can also include patterning a plurality of holes (not shown) in the second conductor layer 370, removing the sacrificial layer by etching through the plurality of holes, and plugging the plurality of holes to form a seal that keeps air inside and ink outside, thereby forming at least one conductive membrane 370 including membrane anchors. Any suitable material, such as, for example doped polysilicon can be used for the at least one conductive electrode 350, the least one conductive membrane and the plurality of membrane anchors.

In various embodiments, the method of fabricating a micro-electromechanical device 300 can include patterning the first conductor layer and the second dielectric layer 340 to form at least one conductive electrode 350 electrically connected to the first dopant-well 314 and one or more first conductive layer regions (not shown) electrically isolated from the conductive electrode 350 and forming at least one conductive membrane 370 including membrane anchors 375, wherein the membrane anchors 375 can be disposed over the one or more first conductive layer regions (not shown) electrically isolated from the conductive electrode 350.

Figure 16:
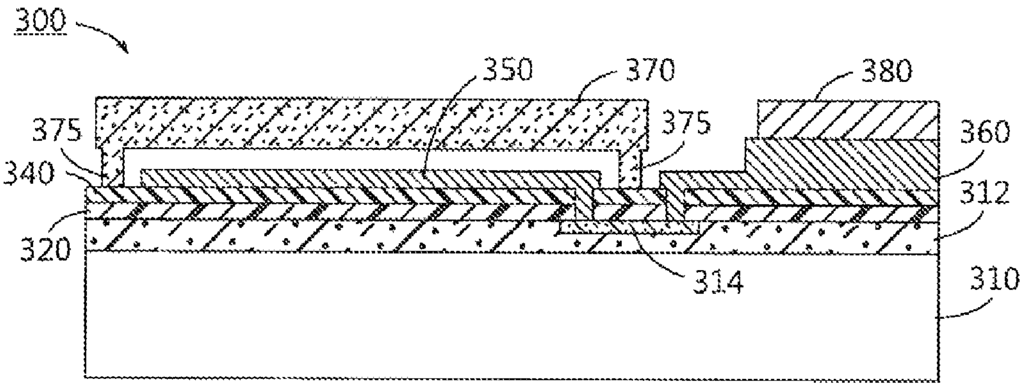
Figure 17:
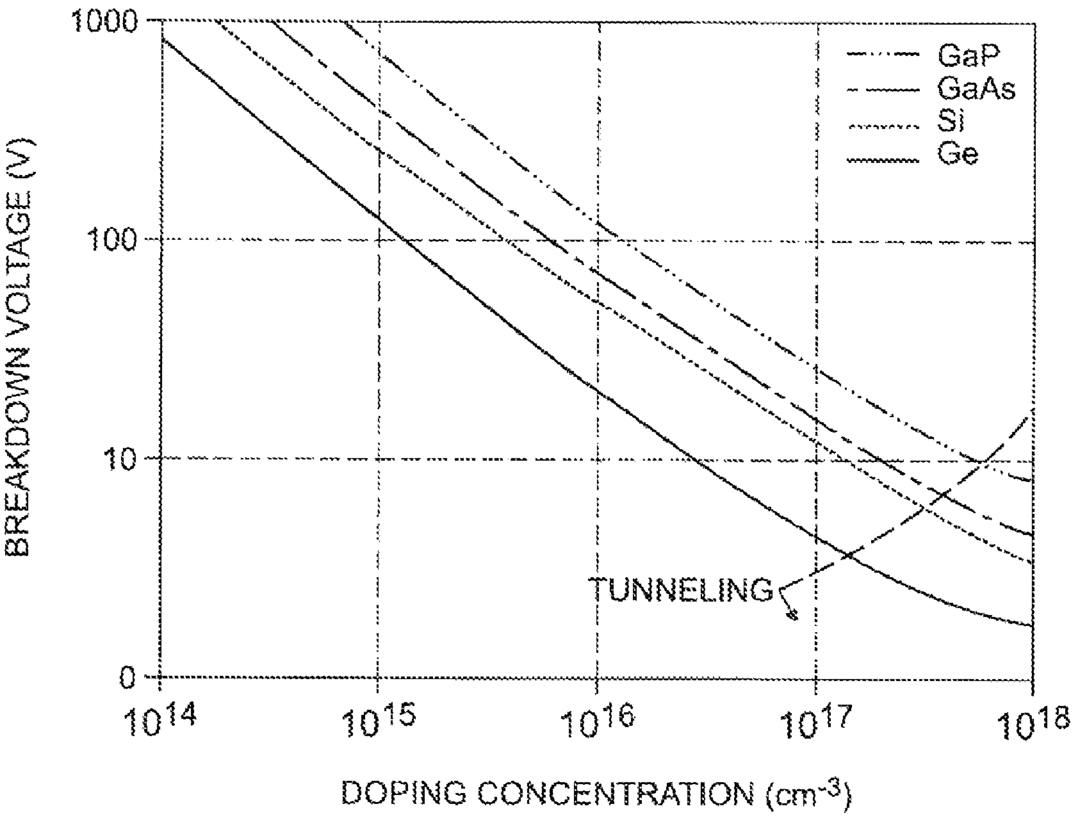
FIG. 17 displays an exemplary avalanche breakdown voltage as a function of doping concentration at 300K, in accordance with the present teachings.

FIG. 16 shows another exemplary micro-electromechanical device 300. The micro-electromechanical device 300 can include a first dielectric layer 320 disposed over a second dopant-doped substrate 310, the second dopant-doped substrate 310 including a first dopant-well 314. In various embodiments, the second dopant-doped substrate can be any suitable substrate, such as, for example, silicon, germanium, gallium arsenide, and gallium phosphide. In certain embodiments, the substrate 310 including a first dopant-well 314 can have a second dopant-doped layer 312. In some embodiments, the first dopant can be selected from the group consisting of nitrogen, phosphorus, arsenic, antimony, and bismuth and the second dopant can be selected from the group consisting of boron, aluminum, gallium, indium, and thalium. In other embodiments, the first dopant can be selected from the group consisting of boron, aluminum, gallium, indium, and thalium and the second dopant can be selected from the group consisting of nitrogen, phosphorus, arsenic, antimony, and bismuth. In various embodiments, the first dielectric layer 320 can include a field oxide layer. The micro-electromechanical device 300 can also include a second dielectric layer 340 disposed over the first dielectric layer 320 and at least one via through the first dielectric layer 320 and the second dielectric layer 340 to form an electrical contact between the first dopant-well 314 and a trace 360, wherein the trace 360 is electrically connected to an power source (not shown). In various embodiments, the second dielectric layer 340 can include any suitable material, such as, for example, silicon nitride. The micro-electromechanical device 300 can further include at least one conductive electrode 350 electrically connected to the first dopant-well 314 and at least one conductive membrane 370 including membrane anchors 375, the membrane anchors 375 disposed over the second dielectric layer 340, such that the at least one conductive membrane 370 is electrically isolated from the at least one conductive electrode 350 and the substrate 310, wherein the at least one conductive electrode 350 is electrically connected to the power source through the first dopant-well 314. In various embodiments, the membrane anchors 375 can be disposed over one or more first conductive layer regions (not shown) electrically isolated from the conductive electrode 350. The micro-electromechanical device 300 can also include a metal layer 380 over the trace 360.

In some embodiments, the micro-electromechanical device 100, 200, 300 can be a sensor. In other embodiments, the micro-electromechanical device 100, 200, 300 can be an actuator.

While the invention has been illustrated respect to one or more implementations, alterations and/or modifications can be made to the illustrated examples without departing from the spirit and scope of the appended claims. In addition; while a particular feature of the invention may have been disclosed with respect to only one of several implementations, such feature may be combined with one or more other features of the other implementations as may be desired and advantageous for any given or particular function. Furthermore, to the extent that the terms “including”, “includes”, “having”, “has”, “with”, or variants thereof are used in either the detailed description and the claims, such terms are intended to be inclusive in a manner similar to the term “comprising.” As used herein, the term “one or more of” with respect to a listing of items such as, for example, A and B, means A alone, B alone, or A and B.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A micro-electromechanical device comprising:

a first dielectric layer;

a buried conductive trace disposed over the first dielectric layer, such that the buried conductor trace is electrically connected to a power source;

a second dielectric layer disposed over the buried conductive trace, the second dielectric layer comprising one or more vias that extend up to the buried conductive trace, wherein the buried conductive trace is disposed between the first dielectric layer and the second dielectric layer;

at least one conductive electrode disposed over the second dielectric layer and electrically connected to the buried conductive trace through the one or more vias; and at least one conductive membrane comprising membrane anchors disposed over the second dielectric layer, such that the at least one conductive membrane is electrically isolated from the at least one conductive electrode and the buried conductor trace and the at least one conductive electrode is within a sealed chamber, wherein the sealed chamber is disposed below the at least one conductive membrane, wherein the at least one conductive membrane is capable of being deflected by a voltage being applied to the at least one conductive electrode, and wherein the at least one conductive electrode is electrically connected to the power source through the buried conductive trace.

2. The micro-electromechanical device of claim 1, wherein the first dielectric layer comprises an insulator substrate.

3. The micro-electromechanical device of claim 1, wherein the first dielectric layer comprises a first dielectric layer disposed over an electrically conductive substrate.

4. The micro-electromechanical device of claim 1, wherein the first dielectric layer comprises a field oxide layer.

5. The micro-electromechanical device of claim 1, wherein the buried conductive trace comprises doped polysilicon.

6. The micro-electromechanical device of claim 1, wherein the second dielectric layer disposed over the buried conductor layer comprises:

a silicon oxide layer disposed over the buried conductor layer; and a silicon nitride layer disposed over the silicon oxide layer.

7. The micro-electromechanical device of claim 1, wherein the membrane anchors are disposed over one or more first conductive layer regions electrically isolated from the conductive electrode.

8. The micro-electromechanical device of claim 1, wherein the device is at least one of an actuator and a sensor.

9. A micro-electromechanical device comprising:

a first dielectric layer disposed over a dopant-doped substrate, the dopant-doped substrate comprising a first depart-well;

a second dielectric layer disposed over and directly adjacent to the first dielectric layer;

at least one via through the first and the second dielectric layer to form an electrical contact between the first dopant-well and a trace, wherein the trace is electrically connected to an outside power source;

at least one conductive electrode electrically connected to the first dopant-well; and at least one conductive membrane comprising membrane anchors, the membrane anchors disposed over the second dielectric layer, such that the at least one conductive membrane is electrically isolated from the conductive electrodes and the substrate and the at least one conductive electrode is within a sealed chamber, wherein the sealed chamber is disposed below the at least one conductive membrane, wherein the at least one conductive membrane is capable of being deflected by a voltage being applied to the at least one conductive electrode, and, wherein the at least one conductive electrode is electrically connected to the power source through the first dopant-well.

10. The micro-electromechanical device of claim 9, wherein the first dielectric layer comprises a field oxide layer.

11. The micro-electromechanical device of claim 9, wherein the second dielectric layer comprises a silicon nitride layer disposed over a field oxide layer.

12. The micro-electromechanical device of claim 9, wherein the membrane anchors are disposed over one or more first conductive layer regions electrically isolated from the conductive electrode.

13. The micro-electromechanical device of claim 9, wherein the device is at least one of an actuator and a sensor.

* * * * *